United States Patent [19]

Suyama et al.

[11] Patent Number: 4,733,114
[45] Date of Patent: Mar. 22, 1988

[54] STEPPING MOTOR

[75] Inventors: Satoshi Suyama, Neyagawa; Toru Arakawa, Nishinomiya, both of Japan

[73] Assignee: Matsushita Electric Industrial Co., Ltd., Osaka, Japan

[21] Appl. No.: 915,278

[22] Filed: Oct. 2, 1986

[30] Foreign Application Priority Data

Oct. 7, 1985 [JP] Japan ................................ 60-223008

[51] Int. Cl.⁴ ............................................ H02K 37/00
[52] U.S. Cl. .................................... 310/49 R; 310/91; 310/112; 310/156
[58] Field of Search ....................... 310/49 R, 162, 163, 310/164, 165, 40 MM, 156, 112, 134, 90, 91, 43, 42

[56] References Cited

U.S. PATENT DOCUMENTS

| | | | |
|---|---|---|---|
| 3,549,918 | 12/1970 | Croymans | 310/49 R |
| 3,678,481 | 7/1972 | Dalziel et al. | |
| 4,355,248 | 10/1982 | Manson | 310/49 R |
| 4,381,465 | 4/1983 | Renkl | 310/49 R |
| 4,438,361 | 3/1984 | Manson | 310/49 R |
| 4,445,155 | 4/1984 | Takahashi et al. | |
| 4,623,809 | 11/1986 | Westley | 310/49 R |

FOREIGN PATENT DOCUMENTS

| | | | |
|---|---|---|---|
| 1276805 | 9/1968 | Fed. Rep. of Germany | 310/162 |
| 3321254 | 12/1984 | Fed. Rep. of Germany | 310/49 R |
| 8603071 | 5/1986 | Int'l Pat. Institute | 310/49 R |
| 47-268 | 1/1972 | Japan . | |
| 50-140807 | 11/1975 | Japan . | |
| 51-7422 | 1/1976 | Japan . | |
| 53-42307 | 4/1978 | Japan . | |
| 0025987 | 2/1984 | Japan . | |
| 0063972 | 4/1984 | Japan | 310/49 R |
| 0119783 | 8/1984 | Japan . | |
| 59-198864 | 11/1984 | Japan . | |
| 2025705 | 1/1980 | United Kingdom | 310/162 |
| 2114685 | 8/1983 | United Kingdom | 310/49 R |

Primary Examiner—R. Skudy
Attorney, Agent, or Firm—Wenderoth, Lind & Ponack

[57] ABSTRACT

A compact stepping motor is equipped with at least four stator plates positioned in parallel with each other, a rotor with a rotary axis perpendicular to the stator plates, and at least two energizing coils each positioned between each two of the stator plates. The rotor is positioned out of the energizing coils. The center axes of the coils and the rotary axis of the rotor are in parallel with each other. One coil is positioned between one pair of stator plates and one coil is positioned between the other pair of stator plates and share a common center axis. Circumferentially arranged stator poles extend from each stator plate perpendicularly to the each stator plate so as to surround the rotor at a specified distance.

10 Claims, 11 Drawing Figures

| EXCITED STATE | STATOR PLATE 21 | STATOR PLATE 22 | STATOR PLATE 23 | STATOR PLATE 24 |
|---|---|---|---|---|
| A | N | S | N | S |
| B | N | S | S | N |
| C | S | N | S | N |
| D | S | N | N | S |

STEPPING MOTOR

BACKGROUND OF THE INVENTION

1. Field of the Invention

This invention relates to a stepping motor used to move a magnetic head of a floppy disk drive, a printer head and the like.

2. Description of the Prior Art

Conventionally well-known stepping motor structures are disclosed in Japanese Laid-Open Patent Application Nos. 47-268 and 50-140807. Those stepping motors are equipped with a circular coil wound along the periphery of a stator pole to allow the central axis of the coil to be coincident with the rotary axis of a rotor.

Stepping motors having this configuration are used in the floppy disk drive units disclosed in U.S. Pat. Nos. 3,678,481 and 4,445,155. The magnetic head of those drive units is moved to a desired location for positioning by means of a combination of the stepping motor and the lead screw.

Recently there has been a need for compact and thin floppy disk drive units, but miniaturization of the stepping motor has been a problem. To thin the drive unit disclosed in U.S. Pat. Nos. 3,678,481 or 4,445,155, the radial size of the stepping motor must be reduced. To reduce the radial size of the stepping motor of the above configuration, the diameter of the rotor or the coil thickness must be reduced. However, the torque of the motor will also be decreased. Although the torque could be increased by increasing the current flowing in the coil or by using a rotor magnet with a high magnetic energy product, it would not be practical due to cost and power consumption restrictions.

Another solution is to dispose the coil so as not to place therein the rotor as disclosed in Japanese Laid-Open Patent Application Nos. 51-7422, 53-42307 and 59-198864. However, the stepping motors disclosed in these references are single-phase motors (for watches), which are not reversible. Also, the structures of these stepping motors are complicated, and their radial sizes cannot be reduced satisfactorily.

SUMMARY OF THE INVENTION

An object of this invention is to provide a compact stepping motor having a substantially decreased radial size compared with conventional stepping motors, without reducing the rotor diameter and the coil thickness, i.e., without decreasing the torque.

Another object of this invention is to provide a stepping motor having a coil having a larger number of turns than that of the conventional coils, using a coil wire of the same diameter and length as those of the conventional coils.

Still another object of this invention is to provide a stepping motor having a stator which has a simple structure which can be easily produced.

A further object of this invention is to provide a stepping motor having a stator which can be easily assembled to improve productivity.

To accomplish the above objects, a stepping motor according to the present invention comprises: at least two pairs of parallel stator plates each having a plurality of stator poles which extend perpendicularly to each stator plate and are arranged circumferentially at predetermined constant intervals, each pair of parallel stator plates being disposed so that the stator poles of the pair of parallel stator plates are arranged alternately so as to form a cylindrical space surrounded by the stator poles; a cylindrical rotor disposed within the cylindrical space and having a plurality of permanent magnet poles at the side surface thereof, each of the permanent magnet poles extending in a direction parallel to the rotational axis of the rotor and opposing the stator plates at a predetermined constant distance; and at least two coils each disposed between each pair of stator plates so that the rotor is positioned out of each coil, a center axis of each coil being parallel to the rotational axis of the rotor.

The above and other objects and features of the present invention will be apparent from the following description taken in connection with the accompanying drawings in which:

DESCRIPTION OF THE PREFERRED EMBODIMENTS

Figure 1:
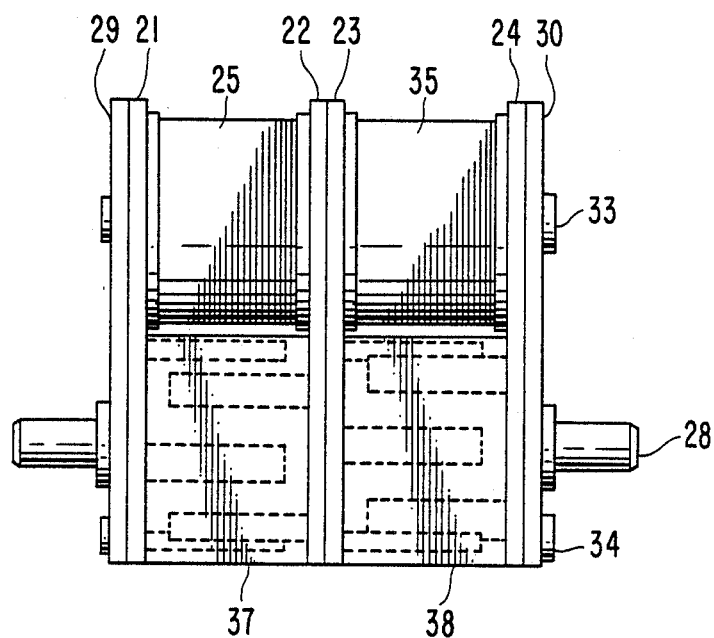
FIG. 1 is a front view of a stepping motor as an embodiment of the present invention.
Figure 3:
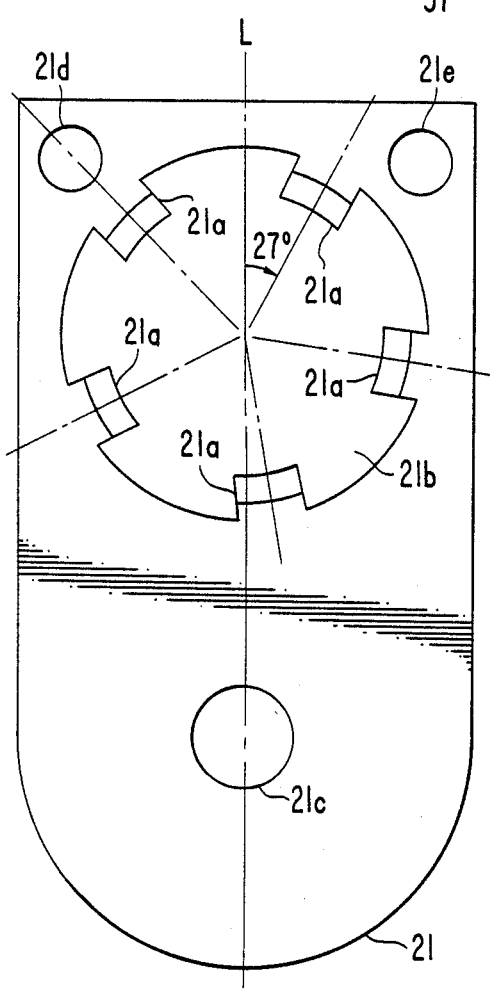
FIG. 3 is a plan view of a stator plate of the stepping motor.
Figure 4:
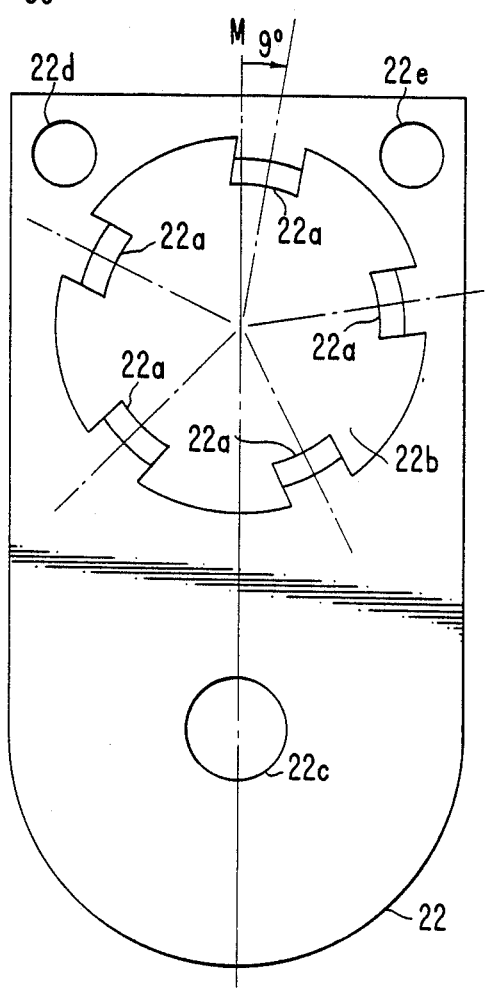
FIG. 4 is a plan view of another stator plate of the stepping motor.
Figure 2:
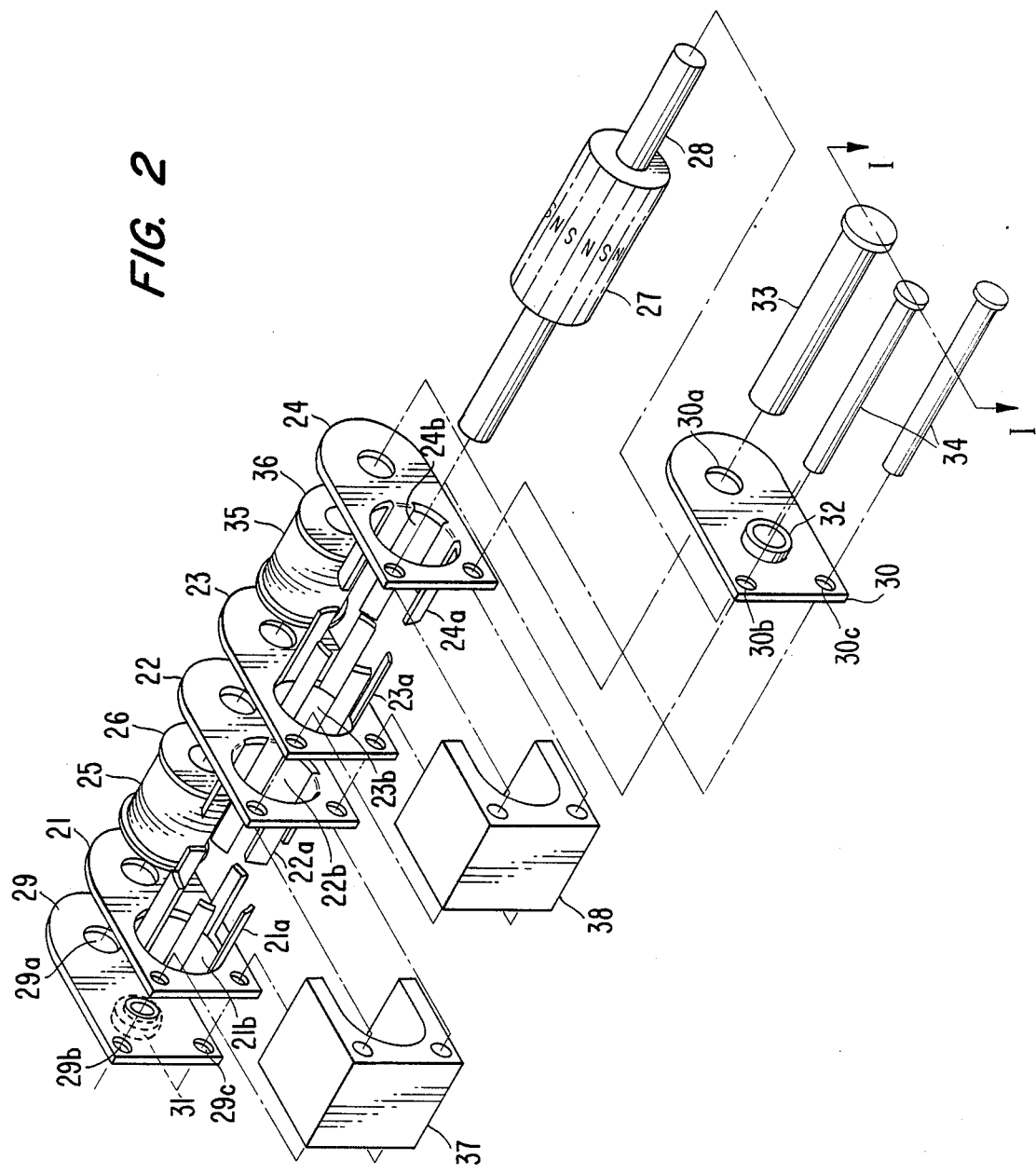
FIG. 2 is an exploded perspective view of the stepping motor.

FIG. 1 shows a front view of a stepping motor embodying the present invention. FIG. 2 shows an exploded perspective view of the stepping motor. Elements 21 to 24 are stator plates. Each stator plate has a circular hole (21b to 24b); and five stator poles (21a to 24a) are fitted to the stator plate around the circumference of their respective circular hole. The stator poles have a same shape and are perpendicular to the stator plates. Stator plates 21 and 24 have the same shape, and stator plates 22 and 23 have the same shape. FIGS. 3 and 4 show stator plates 21 and 22 respectively. Stator plate 21 in FIG. 3 has four holes 21b, 21c, 21d and 21e. Except for hole 21b and the five stator poles 21a, the shape of the stator plate is symmetrical with respect to a center line L. The five stator poles 21a are positioned around the circumference of hole 21b at equal intervals. The stator pole at the maximum distance from hole 21c is disposed at a position which is turned 27° clockwise around the center of hole 21b from the center line L.

Stator plate 22 in FIG. 4 has four holes 22b, 22c, 22d and 22e. Except for hole 22b and the five stator poles 22a, the stator plate is symmetrical with respect to a center line M. The five stator poles 22a are positioned around the circumference of hole 22b at equal intervals. The stator pole at the maximum distance from hole 22c is disposed at a position which is turned 9° clockwise around the center of hole 22b from the center line M.

Stator plates 21 and 22 are the same in shape except for the stator poles. As shown in FIG. 2, therefore, the four stator plates are positioned in parallel with each other, and the corresponding holes in the stator plates are positioned coaxially.

The stator plates should be made of material which has high permeability and low coercive force to form a magnetic path. For example, pure iron, soft steel, or silicon steel may be used as the material. In the execution examples, mild steel plates are used for processing purposes. The stator poles are produced by drawing from the same plate of each stator plate.

Each two of four stator plates 21 to 24, which differ in shape from each other, are combined to make a pair; that is, stator plates 21 and 22 are combined with each other, and stator plates 23 and 24 are combined with each other. Each pair of stator plates are combined so that the stator poles of one stator plate and those of the other are arranged alternately in a circumferential direction at predetermined intervals to form a cylindrical space surrounded by the stator poles of the two stator plates. Also, between each pair of stator plates are retained a coil (25 or 35) wound over a bobbin (26 or 36) and a spacer (37 or 38). Note that the coil is not wound around the above cylindrical space. Each of spacers 37 and 38, which is a resin member with a U-shaped section, keeps the stator plates at both ends thereof in parallel with each other at a constant distance, and covers the perimeter of each stator pole to protect the stator poles from direct external force, and keep them free from dirt and dust.

Elements 29 and 30 are support plates, which have oil containing sintered bearings 31 and 32. Each support plate has three holes (29a to 29c or 30a to 30c) corresponding to the holes of the stator plates.

Two pairs of stator plates 21 to 24 and two support plates 29 and 30, which are positioned in parallel with each other, are secured by a core rod 33 and two reinforcing pins 34 passing through the corresponding holes. Core rod 33, which passes through bobbins 26 and 36, is made, for example, of a soft steel to form a magnetic circuit. The reinforcing pins, which pass through spacers 37 and 38 and connect the components mechanically, are made of material of as low permeability as possible which will not influence the magnetic flux, for example, nonmagnetic stainless steel or brass. The adjacent stator plates 22 and 23 of the two pairs of stator plates are the same in shape and in contact with each other; that is, stator plates 22 and 23 should contact each other. The core rod 33 and the reinforcing pins 34 are calked at the surface of the support plate 29 to secure the construction elements.

Element 27 is a cylindrical rotor which has a plurality of pairs of N and S poles at the side surface of a cylindrical permanent magnet, each pole extending in a direction parallel to the rotational axis of the rotor. Shaft 28, which passes through the center of the rotor, is secured to the rotor. Rotor 27 passes through holes 21b to 24b of the stator plates to be disposed in the cylindrical space formed by the stator poles. Both ends of shaft 28 are fit into oil containing sintered bearings 31 and 32 of support plates 29 and 30. When the assembly is completed, the permanent magnet poles at the periphery of the rotor are retained to face stator poles 21a to 24a of the stator plates with keeping a predetermined constant distance from the stator poles.

Figures 5, 7:
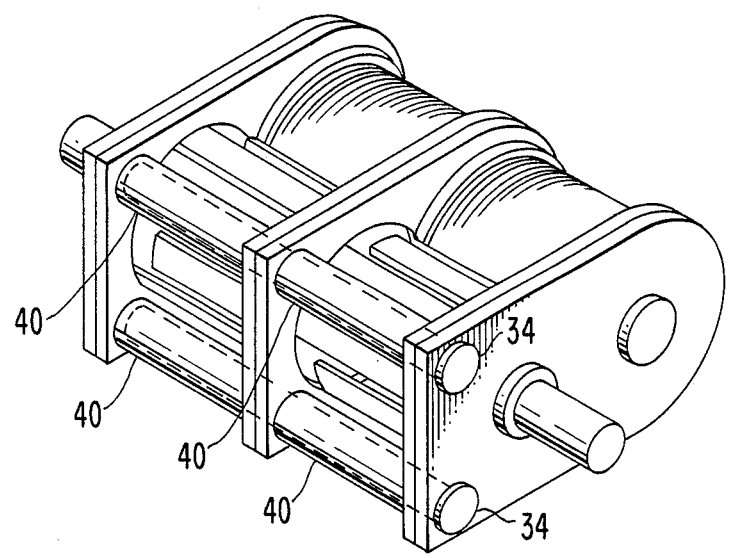
FIG. 5 is a respective view of a stepping motor of another embodiment of the present invention, using another type of spacers.
FIG. 7 is a table showing the energized states of the stator plates of the stepping motor.

Spacers 37 and 38 may be replaced by other various forms of members, for example, cylindrical hollow members 40 as shown in FIG. 5. The spacer material should have as low a permeability as possible to prevent influences on the magnetic flux passing through stator plates 21 to 24.

The operation of the stepping motor mentioned above will be described below.

Figure 6A:
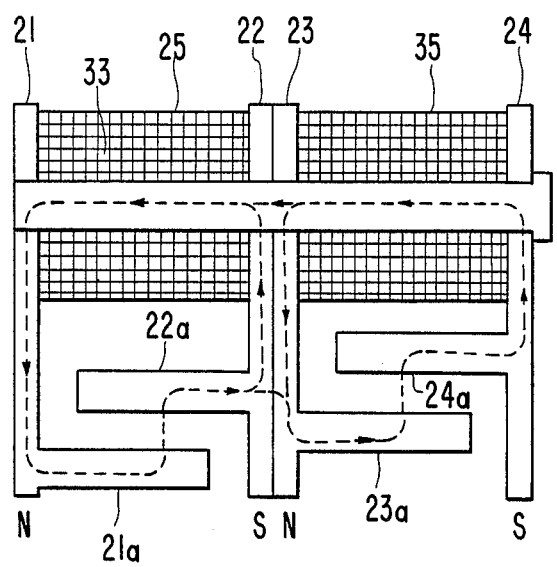
FIGS. 6(a) and 6(b) are sectional views taken along a line I—I of FIG. 2, each showing an energized state of the stepping motor.
Figure 6B:
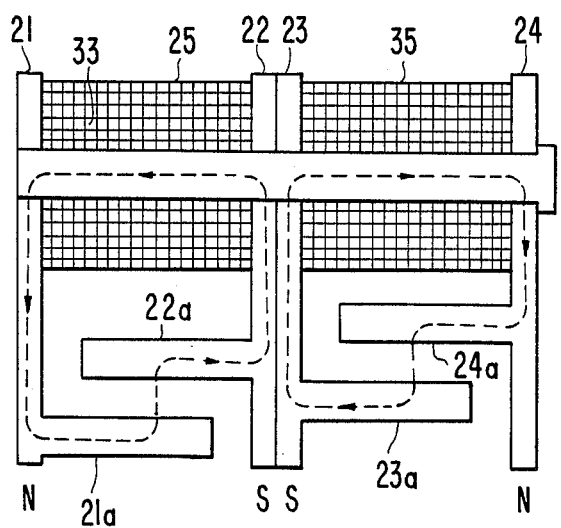

FIGS. 6(a) and 6(b) each show a simplified sectional view along a line I—I of FIG. 2, for showing an energized state of the stepping motor. In each of FIGS. 6(a) and 6(b), only stator plates 21 to 24, coils 25 and 35, and core rod 33 are shown, and only one stator pole is shown for each stator plate. If the two-phase energizing method is selected (i.e. the two coils are simultaneously energized), stator plates 21 to 24 are polarized as N or S poles, causing four types of energized states depending on the combination of the poles.

The table in FIG. 7 gives the polarity of the stator plates in the four energized states A to D. FIG. 6(a) shows a magnetic flux flow in energized state A with dashed lines, and FIG. 6(b) shows a magnetic flux flow in energized state B. The flow of flux in energized state C is opposite to that in energized state A, and the flow of flux in energized state D is opposite to that in energized state B. In either state, the flux forms a loop passing through inside core rod 33. Between the adjacent poles (21a and 22a, or 23a and 24a) of each pair of stator plates, leakage flux, which is discharged into air once and then enters into the stator poles again, is generated. This leakage flux interferes with a flux generated by the permanent magnet of rotor 27 to produce a torque to turn rotor 27.

Figure 8:
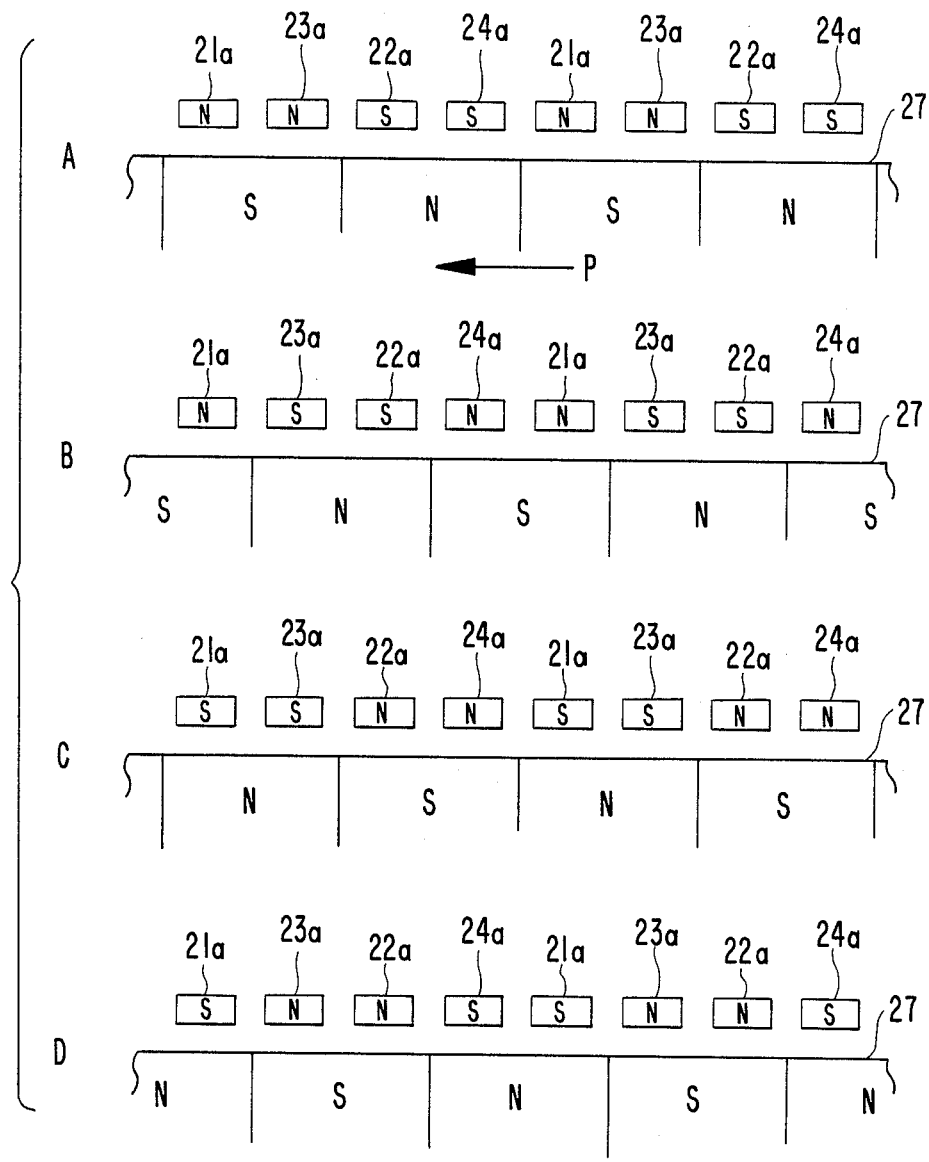
FIG. 8 shows extended views of a part of magnetic pole sections, indicating the positional relationships between the stator magnetic poles and a rotor of the stepping motor corresponding to the states in FIG. 7.

FIG. 8 shows the positioned relationship between stator poles 21a to 24a and rotor 27. States A to D in FIG. 8 correspond to energized states A to D in FIG. 7.

If stator poles 23a and 24a at the static stable position A in FIG. 8 are changed from N pole to S pole and from S pole to N pole respectively by changing the energized state, the N pole or rotor 27 becomes repelled by stator poles 21a and 24a and attracted by stator poles 22a and 23a. The S pole of rotor 27 becomes attracted to stator poles 21a and 24a and repelled by stator poles 22a and 23a. As a result, rotor 27 rotates in the direction of arrow P and reaches the position B in FIG. 8.

If stator pole 21a changes then from N pole to S pole and stator pole 22a changes from S pole to N pole, the N pole of rotor 27 becomes attracted by stator poles 21a and 23a and repelled by stator poles 22a and 24a. The S pole of rotor 27 becomes repelled by stator poles 21a and 23a and attracted to stator poles 22a and 24a. As a result, rotor 27 rotates in the direction of arrow P and reaches the position C in FIG. 8.

If stator pole 23a changes then from S pole to N pole and stator pole 24a changes from N pole to S pole, the N pole of rotor 27 becomes attracted by stator poles 21a and 24a and repelled by stator poles 22a and 23a. The S pole of rotor 27 becomes repelled by stator poles 21a and 24a and attracted by stator poles 22a and 24a. As a result, rotor 27 rotates in the direction of arrow P and reaches the position D in FIG. 8.

If stator pole 21a changes then from S pole to N pole and stator pole 22a changes from N pole to S pole, then rotor 27 rotates in the direction of arrow P and the energized states of the stator poles return to those in A in FIG. 8.

If the energized states of the stator plates change in the order of A, B, C and D, then rotor 27 rotates in one direction. It can be easily understood that, if the energized states of the stator change in the order of D, C, B and A, then rotor 27 rotates in the reverse direction. Rotor 27 can start rotation starting with any of the energized states depending on the initial static stable position, A, B, C or D.

Sator poles 21a to 24a in FIG. 8 form a mechanical angle of 18° with each other in this embodiment, and permanent poles of rotor 27 form a mechanical angle of 36° with each other. Thus, rotor 27 rotates 18° whenever the energized state of the stator plates changes once.

Figure 9:
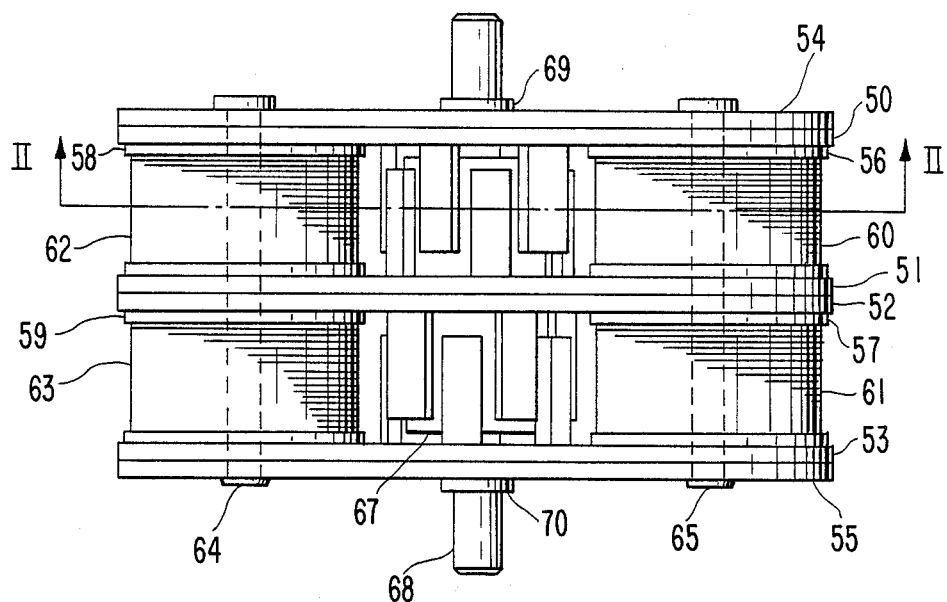
FIG. 9 is a front view of a stepping motor of still another embodiment of the present invention.
Figure 10:
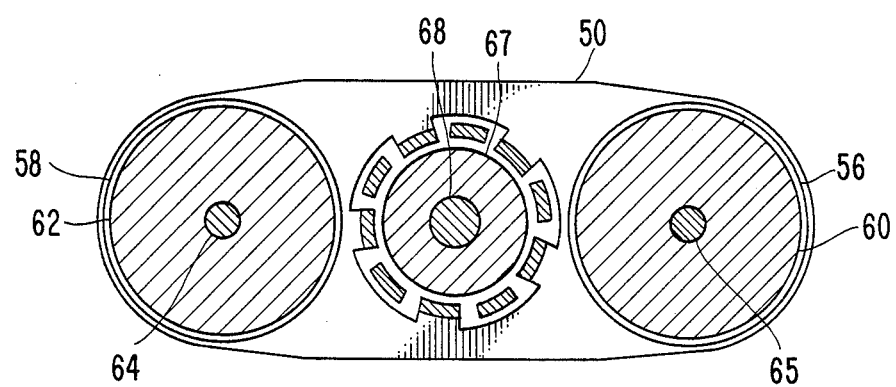
FIG. 10 is a sectional view taken along a line II—II of FIG. 9.

FIGS. 9 and 10 illustrate another embodiment of the stepping motor of the invention.

Elements 50 to 53 are almost elliptical stator plates. Each stator plate has three holes. Five stator poles are fitted around the circumference of a circular hole at the center of each stator plate. Stator plates 50 and 53 are the same in shape, and stator plates 51 and 52 are the same in shape though the different shapes of stator plates are also the same in shape at parts except that the stator pole positions differ from each other. The positional relationships between the two types of stator poles is basically the same as the embodiment of FIG. 1. A detailed explanation of the positional relationship between the two types of stator poles has been omitted because it is readily understandable.

The stator plates are made of soft steel plates to form a magnetic path, and the stator poles are produced by drawing.

The two different forms of stator plates are combined to make a pair; that is, stator plates 50 and 51 are combined, and stator plates 52 and 53 are combined in the same way as the embodiment of FIG. 1. Each pair of stator plates retain two coils (60 and 61 or 62 and 63) wound over bobbins (56 and 57 or 58 and 59) between them. Elements 54 and 55 are support plates. Oil containing sintered bearings 69 and 70 are secured to the center of the support plates respectively. Each support plate has two holes corresponding to the holes of the stator plates.

Two pairs of stator plates 50 to 53 and two support plates 54 and 55, which are positioned in parallel with each other, are secured by two core rods 64 and 65 passing through the corresponding holes. Core rod 64 passing through bobbins 58 and 59 and core rod 65 passing through bobbins 56 and 57 are made of soft steel in order to form a magnetic circuit. The adjacent stator plates of the two pairs of stator plates should be the same in shape and in contact with each other; that is, stator plates 51 and 52 should contact each other. Core rod 64 and 65 are calked at the surface of support plate 55 to secure the construction elements.

Element 67 is a rotor which has a plurality of pairs of N and S poles at the side surface of a cylindrical permanent magnet, each pole extending in a direction parallel to the rotational axis of the rotor. Shaft 68, which passes through the center of the rotor, is secured to the rotor.

Rotor 67 passes through the holes at the center of the stator plates. Both ends of shaft 68 are fit into the oil containing sintered bearings 69 and 70 of support plates 54 and 55. When the assembly is completed, the permanent magnet poles at the periphery of the rotor are retained to face the stator poles of the stator plates at a constant distance.

The above explanations reveal that shaft 68 and two core rods 64 and 65 are in parallel with each other. In this embodiment, shaft 68 and two core rods 64 and 65 are positioned to allow their center lines to be on one plane. If this occurs, it is understandable that the radial size of the stepping motor in FIGS. 9 and 10 is minimized.

The stepping motor of this embodiment is more useful when increasing the magnetic flux generated by the coils than the embodiment in FIG. 1 or when decreasing the power consumption below that of the embodiment of FIG. 1. This stepping motor has two more coils than that in FIG. 1. The two coils disposed between each pair of stator plates have the same winding direction. When the two coils are energized, any energized states of different polarities will not be generated in one stator plate. Therefore, the energized states of the stator plates when operating the stepping motor in this embodiment are the same as those in the embodiment in FIG. 1. A detailed explanation of the energized states of the stator plates has been omitted because it is readily understandable.

Note that the usefulness of this invention is not limited to the above embodiments, but can be modified in various ways. In the above embodiments, for instance, four stator plates are used. More stator plates may be combined. The number of stator poles may not only be five, but more stator poles may be used. The rotor has several pairs of N and S poles at the periphery of the cylindrical permanent magnet in the above embodiments. Rotor pole plates, between which a permanent magnet of single pole lies, may be used to form many magnetic poles.

As described above, this invention makes it possible to produce a stepping motor, the radial size of which is substantially reduced as compared with conventional stepping motors. In conventional stepping motors, a coil is wound over the periphery of the stator poles, and the coil diameter could not be reduced to less than a fixed value. According to the stepping motor of this invention, a coil is wound over a narrow core rod. When a coil wire of the same diameter and length as those of conventional stepping motors is used, the number of turns increases substantially. The magnetic field intensity generated by a coil is the product of the number of coil turns and the current passing through the coil. When allowing the same value of current as conventional to flow in the coil, the magnetic field intensity increases and the generated torque also increases. In other words, an efficient stepping motor which may minimize the power needed to produce the same torque as a conventional motor can be realized.

The components of the stepping motor of the invention are simple in shape compared with those of conventional stepping motors. For example, conventional cup-shape stator plates have been changed to flat plates, enabling easy production. Flat stator plates do not have the rotary-symmetrical structure, and the direction and the position can be easily specified when assembling them.

What is claimed is:
1. A stepping motor comprising:
at least two pairs of parallel stator plates each having a first hole and a second hole having a circular circumference from which a plurality of stator poles are extended in a perpendicular direction to each plate of said pair of stator plates and arranged circumferentially at predetermined constant inter- vals, each pair of stator plates of said at least two pairs of stator plates being disposed so that said stator poles of said each pair of stator plates are arranged alternately so as to form a cylindrical space surrounded by said alternately arranged stator poles, one stator plate of one of said pairs of stator plates of said at least two pairs of stator plates being in contact with one stator plate of another pair of stator plates of said at least two pairs of stator plates so that one end of said cylindrical space formed by said one pair of stator plates coincides with one end of said cylindrical space formed by said another pair of stator plates to form an extended cylindrical space;

a cylindrical rotor disposed within said extended cylindrical space and having a plurality of alternately arranged N and S permanent magnet poles at a side surface thereof, each of said permanent magnet poles extending in a direction parallel to a rotational axis of said rotor and opposing said stator poles at a predetermined constant distance from said stator poles;

a common core rod penetrating said at least two pairs of parallel stator plates each through said first hole so as to be in parallel to said rotational axis of said rotor; and at least one pair of energizing coils each disposed between said each pair of stator plates and wound around said common core rod so that said common core rod magnetically couples said at least two pairs of parallel stator plates, whereby said rotor is positioned out of each of said at one pair of energizing coils.

2. A stepping motor according to claim 1, wherein each of said at least two pairs of parallel stator plates and said stator poles extending therefrom are made of a single plate.

3. A stepping motor according to claim 1, further comprising a pair of support plates for supporting therebetween two pairs of said at least two pairs of parallel stator plates, each of said pair of support plates having a bearing for supporting each end of a shaft of said rotor.

4. A stepping motor according to claim 1, further comprising a reinforcing pin which is made of a material having a low magnetic permeability and which penetrates said two pairs of parallel stator plates for reinforcing fixation of said stator plates.

5. A stepping motor according to claim 1, further comprising a spacer which is made of a material having a low magnetic permeability and is disposed between two pairs of said at least two pairs of parallel stator plates for keeping a distance between said each pair of parallel stator plates.

6. A stepping motor according to claim 5, wherein said spacer is made of resin.

7. A stepping motor according to claim 5, wherein said spacer is a U-shaped member disposed to cover said circumferentially arranged stator poles.

8. A stepping motor according to claim 1, wherein each of said at least two pairs of parallel stator plates further has a third hole, and said motor further comprises: another common core rod penetrating said parallel stator plates each through said third hole so as to be in parallel with said rotational axis of said rotor; and at least another pair of energizing coils each disposed between a pair of said at least two pairs of parallel stator plates and wound around said another common core rod so that said another common core rod magnetically couples two pairs of said at least two pairs of parallel stator plates.

9. A stepping motor according to claim 8, wherein said third hole is disposed so that said rotor is positioned between said common core rod and said another common core rod.

10. A stepping motor according to claim 8, wherein said thid hole is positioned so that said rotational axis of said rotor and respective center lines of said common core rod and said another common core rod are positioned on one plane.

* * * * *